United States Patent
Zavalishin et al.

(10) Patent No.: US 10,796,144 B2
(45) Date of Patent: Oct. 6, 2020

(54) METHOD AND DEVICE FOR CLASSIFYING SCANNED DOCUMENTS

(71) Applicant: HEWLETT-PACKARD DEVELOPMENT COMPANY, L.P., Spring, TX (US)

(72) Inventors: Sergey Stanislavovich Zavalishin, Moscow (RU); Andrey Alekseevich Bout, Rostov-na-Donu (RU); Ilya Vasilyevich Kurilin, Moscow (RU); Michael Nikolaevich Rychagov, Moscow (RU)

(73) Assignee: Hewlett-Packard Development Company, L.P., Spring, TX (US)

( * ) Notice: Subject to any disclaimer, the term of this patent is extended or adjusted under 35 U.S.C. 154(b) by 447 days.

(21) Appl. No.: 15/609,296

(22) Filed: May 31, 2017

(65) Prior Publication Data
US 2017/0351914 A1    Dec. 7, 2017

(30) Foreign Application Priority Data

Jun. 2, 2016   (RU) .................................. 2016121715
Feb. 24, 2017  (KR) ........................ 10-2017-0025024

(51) Int. Cl.
*G06K 9/00*      (2006.01)
*G06K 9/46*      (2006.01)
(Continued)

(52) U.S. Cl.
CPC ....... *G06K 9/00456* (2013.01); *G06K 9/4642* (2013.01); *G06K 9/481* (2013.01);
(Continued)

(58) Field of Classification Search
None
See application file for complete search history.

(56) References Cited

U.S. PATENT DOCUMENTS

| 5,295,181 A | 3/1994 | Kuo |
| 5,435,544 A | 7/1995 | Mandel |

(Continued)

OTHER PUBLICATIONS

Abdenour Hadid et al. "A Discriminative Feature Space for Detecting and Recognizing Faces" Jun. 27, 2004.
(Continued)

*Primary Examiner* — Chan S Park
*Assistant Examiner* — Elisa M Rice
(74) *Attorney, Agent, or Firm* — Jefferson IP Law, LLP (57) ABSTRACT

A method and device for automatically classifying document hardcopy images by using document hardcopy image descriptors are provided. The method and device include providing a document hardcopy image, the document hardcopy image having image features, extracting image descriptors by a first set of image descriptor extractors, each image descriptor of the image descriptors being descriptive of the image features of the document hardcopy image, estimating class probabilities of the document hardcopy image by multiple trained classifiers based on the image descriptors, determining a most probable class of the document hardcopy image by a trained meta-classifier based on the class probabilities estimated by the multiple trained classifiers, inputting the document hardcopy image and the most probable class of the document hardcopy image to an assigner, and assigning, by the assigner, the most probable class determined by the trained meta-classifier to the document hardcopy image to obtain a classified document hardcopy image.

19 Claims, 6 Drawing Sheets

(51) Int. Cl.
  *G06K 9/62* (2006.01)
  *G06K 9/48* (2006.01)
  *G06K 9/66* (2006.01)
(52) U.S. Cl.
  CPC ......... *G06K 9/6269* (2013.01); *G06K 9/6277* (2013.01); *G06K 9/6292* (2013.01); *G06K 9/66* (2013.01); *G06K 2009/4666* (2013.01); *G06K 2209/27* (2013.01)

(56) References Cited

U.S. PATENT DOCUMENTS

| | | | |
|---|---|---|---|
| 5,525,031 | A | 6/1996 | Fox |
| 5,602,973 | A | 2/1997 | Nishiwaki |
| 8,249,343 | B2 | 8/2012 | Perronnin et al. |
| 8,462,394 | B2 | 6/2013 | Fan et al. |
| 8,532,399 | B2 | 9/2013 | Perronnin et al. |
| 8,713,007 | B1 | 4/2014 | Korolev et al. |
| 8,744,183 | B2 | 6/2014 | Urbach et al. |
| 8,831,361 | B2 | 9/2014 | Pintsov |
| 2007/0272601 | A1* | 11/2007 | Cormack ............ B07C 3/06 209/584 |
| 2016/0034773 | A1* | 2/2016 | Goncalves ............ G06K 9/18 382/103 |

OTHER PUBLICATIONS

Emre Akbas et al. "Automatic Image Annotation by Ensemble of Visual Descriptors", Jun. 17, 2007.

Gabriela Csurka et al. "What is the right way to represent document images?", Mar. 3, 2016.

Uchida Yusuke et al. "Image Retrieval with Fisher Vectors of Binary Features", Nov. 5, 2013.

N. Chen et al, A survey of document image classification: problem statement, classifier architecture and performance evaluation, Springer, 2006.

T. Ojala et al, Multiresolution gray-scale and rotation invariant texture classification with local binary patterns, PAMI, 2010.

A. Gordo et al, Large-scale document image retrieval and classification with runlength histograms and binary embeddings, Pattern Recognition, vol. 46, 2012.

F. Cesariniet et al, Encoding of modified X-Y trees for document classification, Document Analysis and Recognition, IEEE, 2001.

Hongming Zhang et al, Object detection using spatial histogram features, Image and Vision Computing, vol. 24, Issue 4, 2006, pp. 327-341.

J. Sanchez et al, Image Classification with the Fisher Vector: Theory and Practice, International Journal of Computer Vision 105, pp. 222-245, 2013.

P. Viola et al, Rapid Object Detection using a Boosted Cascade of Simple Features, CVPR 2001. Proceedings of the 2001 IEEE Computer Society Conference, 2001.

Uchida et al, Image Retrieval with Fisher Vectors of Binary Features, Pattern Recognition (ACPR), 2016.

E. Rublee et al, ORB: an efficient alternative to SIFT or SURF, Computer Vision (ICCV), 2011.

\* cited by examiner

METHOD AND DEVICE FOR CLASSIFYING SCANNED DOCUMENTS

CROSS-REFERENCE TO RELATED APPLICATIONS

This application claims the benefit under 35 U.S.C. § 119(a) of a Russian patent application filed on Jun. 2, 2016 in the Russian Patent Office and assigned Serial number 2016121715 and of a Korean patent application filed on Feb. 24, 2017 in the Korean Intellectual Property Office and assigned Ser. No. 10-2017-0025024, the entire disclosure of each of which is hereby incorporated by reference.

TECHNICAL FIELD

The present disclosure relates to the field of document processing and management. More particularly, the present disclosure relates to a method and device for classifying document hardcopy images, and a system for sorting document hardcopies.

BACKGROUND

In spite of modern progress in the field of electronic document management, there is a big variety of business documents, which are still presented in the form of hardcopies. Typical office documents, which need to be presented in hardcopies, are related to accounting, legal documents, personal information, official mails and so on. Usually tables, stamps, logos, facsimiles or signatures can accompany such documents. A large number of hardcopies come to organizations by mail, fax and courier delivery services, which presuppose manual paperwork.

Accordingly, there is a demand for an automatic document classification method that more efficiently analyzes document images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for analyzing document hardcopy images to determine classes and automatically outputting hardcopies into output bins assigned for the classes.

The object of the present disclosure is to eliminate or mitigate the above-mentioned drawbacks peculiar to the solutions known from the prior art.

More specifically, the object of the present disclosure is to provide a tool for automatically classifying document hardcopy images and sorting document hardcopies based on the classified document hardcopy images, and for further processing scenarios for each document hardcopy. One scenario implies that bills, invoices and financial reports should be transmitted to an accounts department, while mails should be delivered by receptionists to recipients.

Given the above, the technical result achieved by using the present disclosure consists in enabling automatic classification of the document hardcopy images.

In accordance with an aspect of the present disclosure, a method of classifying document hardcopy images is provided. The method includes providing a document hardcopy image, the document hardcopy image having image features, extracting image descriptors by a first set of image descriptor extractors, each image descriptor of the image descriptors being descriptive of the image features of the document hardcopy image, estimating class probabilities of the document hardcopy image by multiple trained classifiers based on the image descriptors, determining a most probable class of the document hardcopy image by a trained meta-classifier based on the class probabilities estimated by the multiple trained classifiers, inputting the document hardcopy image and the most probable class of the document hardcopy image to an assigner, and assigning, by the assigner, the most probable class determined by the trained meta-classifier to the document hardcopy image to obtain a classified document hardcopy image.

The multiple trained classifiers and the trained meta-classifier are obtained by storing a training set including training images and class labels in a memory, the class labels being associated with the training images, and each training image of the training images having training-image features, inputting the training images of the training set stored in the memory to a second set of image descriptor extractors, extracting the training-image descriptors by the second set of image descriptor extractors, each training-image descriptor of the training-image descriptors being descriptive of the training-image features of each training image of the training images, obtaining the multiple trained classifiers by a classifier trainer by using the training-image descriptors extracted by the second set of image descriptor extractors and the class labels associated with the training images, estimating class probabilities of the training images by the multiple trained classifiers, and obtaining a trained meta-classifier by a meta-classifier trainer based on the class probabilities estimated by the multiple trained classifiers and the class labels associated with the training images.

In one embodiment, a number of the multiple trained classifiers is equal to a number of the image descriptor extractors in the second set of image descriptor extractors, and each of the multiple trained classifiers is associated with one of the second set of image descriptor extractors.

In some embodiments, the image descriptor extractors in each of the first set of image descriptor extractors and the second set of image descriptor extractors include a spatial local binary pattern (SLBP) extractor, a grayscale runlength histogram (GRLH) extractor, and a Bernoulli Mixture Model Fisher vectors (BMMFV) extractor.

Each of the image descriptors and the training-image descriptors can be a numeric vector of integer, real or binary numbers. Classes of the document hardcopy image and the training images can be integer numbers or textual labels. The image features and the training-image features can relate to a shape, texture and/or color of the document hardcopy image and the training images, respectively.

In one embodiment, providing of the document hardcopy image includes obtaining the document hardcopy image by a scanner, a facsimile machine, a photo camera, a video camera, a reader, or through a wireless or wired communication network.

In one embodiment, the first set of image descriptor extractors and the second set of image descriptor extractors are the same set of image descriptor extractors.

In one embodiment, the trained multiple classifiers are support vector machines (SVM).

The estimating of the class probabilities of the document hardcopy image can include obtaining a vector of real numbers that represents probabilities of the document hardcopy image belonging to a certain class.

The determining of the most probable class by the trained meta-classifier can include concatenating multiple probability vectors estimated by the multiple trained classifiers into a single vector, estimating the class probabilities of the document hardcopy image by using the SVM and concatenated multiple probability vectors, and choosing the class a highest probability as the most probable class.

The storing of the training set can further include receiving the training set, choosing a random subset of the training images and the class labels from the training set, and storing the random subset in the memory.

The extracting of the image descriptors or the training-image descriptors by the SLBP extractor can include recursive subdividing the document hardcopy image or each training image of the training images into plurality of horizontal and vertical stripes, downsampling each stripe to the same size, extracting a local binary pattern (LBP) for each pixel of each downsampled stripe, computing a binary pattern histogram for each downsampled stripe, concatenating the computed binary pattern histograms into the image descriptor or training-image descriptor, and normalizing the image descriptor or training-image descriptor.

The extracting of the image descriptors or training-image descriptors by the GRLH extractor can include downsampling the document hardcopy image or each training image, recursive subdividing the downsampled document hardcopy image or training image into a plurality of horizontal and vertical stripes, extracting runlengths of similar brightness for each line of stripe in horizontal, vertical, diagonal and anti-diagonal directions, computing runlength histograms for each stripe, brightness value and length, concatenating the computed runlength histograms into the image descriptor or the training-image descriptor, and normalizing the image descriptor or the training-image descriptor.

The extracting of the image descriptors or the training-image descriptors by the BMMFV extractor can include downsampling the document hardcopy image or each training image, recursive subdividing the downsampled document hardcopy image or training image into a plurality of horizontal and vertical stripes, extracting binary local descriptors for each stripe, reducing dimensions of the extracted binary local descriptors by using a principal component analysis algorithm (PCA), computing a Bernoulli mixture model for the dimensionally-reduced local descriptors, computing Fisher vectors on the basis of the computed Bernoulli mixture model, power normalizing and L2 normalizing of the computed Fisher vectors, and concatenating the normalized Fisher vectors for each stripe into the image descriptor or the training-image descriptor. The binary local descriptors can be one of Binary Robust Invariant Scalable Keypoints (BRISK) or Oriented Robust Binary (ORB) descriptors.

In accordance with another aspect of the present disclosure, a device for classifying document hardcopy images is provided. The device includes a memory configured to store instructions, and at least one processor electrically connected to the memory that when executing the stored instructions is configured to classify the document hardcopy images, including a first set of image descriptor extractors configured to extract image descriptors for a document hardcopy image inputted to the first set of image descriptor extractors, the document hardcopy image having image features, and each image descriptor of the image descriptors being descriptive of the image features of the document hardcopy image, estimate class probabilities of the document hardcopy image by using the image descriptors, determine a most probable class of the document hardcopy image by using the class probabilities estimated by the multiple trained classifiers, and assign the most probable class to the document hardcopy image to obtain a classified document hardcopy image.

The at least one processor is further configured to store in the memory a training set comprising training images and class labels, the class labels being associated with the training images, and each training image of the training images having training-image features, receive the training images of the training set stored in the memory and extract training-image descriptors, each training-image descriptor of the training-image descriptors being descriptive of the training-image features of each training image of the training images, obtain the trained multiple classifiers by using the training-image descriptors extracted by the second set of image descriptor extractors and the class labels associated with the training images, wherein the multiple trained classifiers are configured to estimate class probabilities of the training images, and obtain a trained meta-classifier by using the class probabilities estimated by the multiple trained classifiers and the class labels associated with the training images.

The various embodiments of the device according to the second aspect of the present disclosure are similar to the various embodiments of the method according to the first aspect of the present disclosure.

In accordance with another aspect of the present disclosure, a system for sorting document hardcopies is provided. The system includes a hardcopy sorting apparatus including an input bin for document hardcopies, an image capturer configured to capture document hardcopy images, a notification indicator configured to display an assigned class of each document hardcopy image of the document hardcopy images, and one or more output bins for sorted document hardcopies, and at least one processor configured to assign the class to each document hardcopy image of the document hardcopy images, assign, to each document hardcopy of the document hardcopies, the output bin according to the assigned class of each document hardcopy image of the document hardcopy images, receive information about a number of the output bins and a number of non-empty output bins from the hardcopy sorting apparatus and the document hardcopy images having the assigned classes from the device for classifying the document hardcopy images, assign the number of the output bins to each document hardcopy according to the assigned class of respective document hardcopy image and the number of non-empty output bins, and route the document hardcopy from the input bin to the assigned output bin.

The image capturing means can be one of a scanner, a facsimile machine, a photo camera, a video camera, a reader for reading an image file from a storage medium, or an input interface for receiving an image file via the Internet.

The notification indicator can be a liquid crystal display (LCD) or light-emitting diode (LED) indicator.

In one embodiment, the notification indicator is further configured to display the necessity to empty the output bin.

Other features and advantages of the present disclosure will be apparent upon reading the following detailed description and reviewing the accompanying drawings.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that although the terms "first", "second", etc. may be used herein to describe various components, these components should not be limited by these terms. These components are only used to distinguish one component from another.

Throughout the specification, it will be understood that when an element is referred to as being "connected" to another element, it may be "directly connected" to the other element or "electrically connected" to the other element with intervening elements therebetween. It will be further understood that when a part is referred to as being "connected to" another part, it may communicate data with the other part through signal transmission/reception.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The electronic device, methods, and examples provided herein are illustrative only and not intended to be limiting.

As used herein, the term "and/or" includes any and all combinations of one or more of the associated listed items. Expressions such as "at least one of" when preceding a list of elements, modify the entire list of elements and do not modify the individual elements of the list.

Hardcopies can be classified by using different ways, in particular, based on image (visual) features and text (content meaningful) features. Many of existing approaches—such, for example, as that disclosed in "A survey of document image classification problem statement, classifier architecture and performance evaluation" by N. Chen, D. Blostein, International Journal of Document Analysis and Recognition, vol. 10, iss. 1, pp. 1-16. June 2007—focus on textual information, as this is an essential data. However, there are many situations for business documents when the amount of text in a document is relatively small or even absent, or includes only handwritten text that is difficult to recognize. Therefore, some of the prior art solutions, such, for example, as those disclosed in U.S. Pat. Nos. 8,831,361 and 8,462,394, suggest using text information along with visual information to improve classification accuracy. However, these solutions still suffer from being computation-consuming because of the necessity to perform an optical character recognition operation for text analysis.

Some other approaches require document layout extraction, with a document layout being presented in the form of a binary (or more complicated) tree. One example is disclosed in U.S. Pat. No. 8,744,183. The major drawback of similar approaches is related to the difficulty of layout extraction in complex documents and sometimes to insufficient robustness. For example, in the case of a well-structured document printed on a white paper, it is easy to determine its header, footer and content blocks. However, it is difficult or even impossible to perform such determination when a document includes mixed tables or background graphics.

Image feature-based methods provide a more robust way to work with any document layout and background. More specifically, these methods involve three major pipelines for the extraction of a document image descriptor spatial local binary patterns (SLBPs), grayscale runlength histograms (GRLHs), and Fisher vectors.

The local binary patterns (LBPs) have recently become extremely popular for face recognition, but they are rarely applied for document classification. Existing methods are focused mainly on the extraction of LBPs for the whole image of a scanned document, or for document specific parts (see T. Ojala, M. Pietikäinen, M. Maenpaa, "Multiresolution gray-scale and rotation invariant texture classification with local binary patterns", PAMI, 2010).

The document image descriptor based on the runlength histograms is discussed in U.S. Pat. No. 8,249,343, according to which the document image descriptor is designed especially for binary documents. However, the obvious drawback of the document image descriptor known from U.S. Pat. No. 8,249,343 is that it can be applied only to simple black-white business documents, i.e. it cannot be used as a grayscale image descriptor.

As noted above, the Fisher vectors are also used to extract the document image descriptor. The image classification based on the Fisher vectors is described in "Image Classification with the Fisher Vector Theory and Practice" by J. Sanchez, F. Perronnin, T. Mensink, J. Verbeek, In International Journal of Computer Vision pp. 105. The example of the document image descriptor extracted with the Fisher vectors is described in U.S. Pat. No. 8,532,399.

Further, some examples of respective means for sorting documents based on the above-mentioned approaches and methods are given in U.S. Pat. Nos. 5,435,544, 5,525,031, and 5,602,973. A typical mailbox in a printer has multiple output bins, which allows sorting printed hardcopies by their user or user group predefined affinity, as described in U.S. Pat. No. 5,295,181. The major drawback of such sorting is that the affinity is set in advance and all documents, which are sent to the printer, have it. The affinity is determined by using barcodes, which have to be printed on any document, hence, documents without the barcodes remain unrecognized. In addition, the number of the output bins limits the number of possible document classes.

Figure 1:
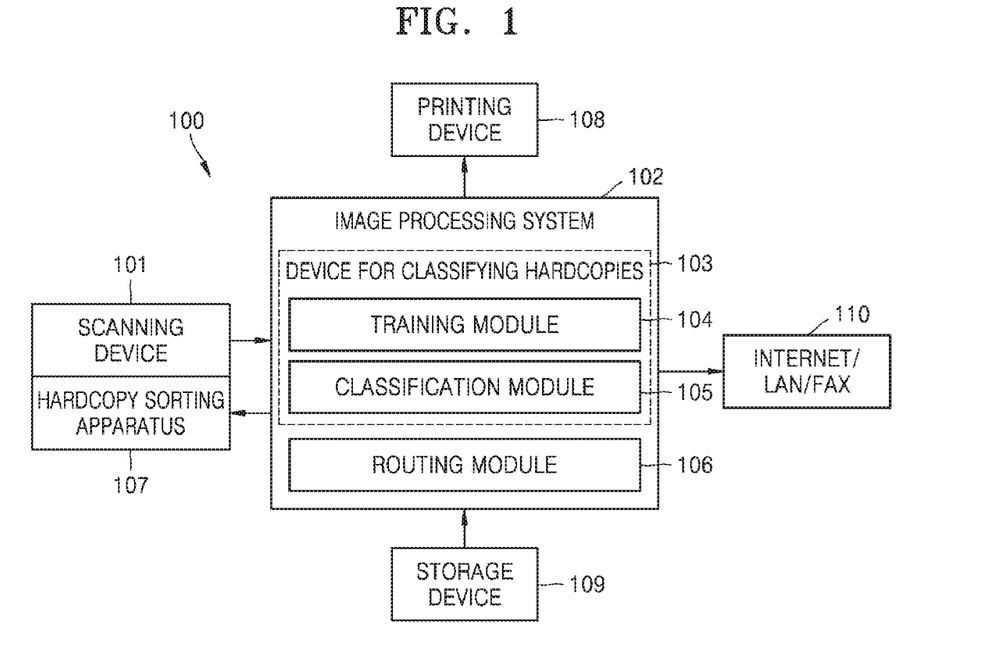
FIG. 1 illustrates a system for sorting scanned document hardcopies according to an embodiment of the present disclosure.

FIG. 1 illustrates a system for sorting document hardcopies according to an embodiment of the present disclosure.

Referring to FIG. 1, as can be seen, a system 100 comprises a scanning device 101, an image processing system 102, a hardcopy sorting apparatus 107, a printing device 108, and a storage device 109. In general, the scanning device 101 can be accompanied or substituted by another means, suitable for image acquisition, such as a photo camera, media storage with image files, and so forth. The image processing system 102 comprises a device 103 for classifying document hardcopy images and a routing module 106. The device 103 for classifying document hardcopy images comprises a training module 104 and a classification module 105.

The training module 104 is configured to train multiple classifiers using a classifier training means in order to obtain multiple trained classifiers, and train a meta-classifier in order to obtain a trained meta-classifier. The training module 104 will be described in more detail below with reference to FIG. 3.

The classification module 105 is used for classifying the document hardcopy images and will be described in more detail below with reference to FIG. 3. The routing module 109 is configured to assign an output bin to each document hardcopy according to an assigned class of respective document hardcopy image.

The assigned class of each document hardcopy image is transmitted to the hardcopy sorting apparatus 107 in order to perform hardcopy sorting in accordance with the assigned class. The hardcopy sorting involves the separation of a bunch of document hardcopies into sets related to appropriate classes defined by a training set. The training set consists of training images and assigned class labels. Depending on user preferences or selections, the electronic copy of the document hardcopy can be printed by the printing device 108, stored by the storage device 109, or shared via other means, such as Internet, a local network or fax 110, for future processing and management.

It should be noted that any module of the system 100 can be combined in a single off-line device or distributed separately, connected by a wired network or a wireless system for data exchange, or combined in sub-systems with another one. For example, the scanning device 101 can also include the image processing system 102 or the printing device 108 and may be embedded into a multifunction peripheral device (MPD), such as a multifunction printer (MFP). The image processing system 102 can be implemented by at least one processor and a memory with instructions for the extraction of image descriptors, classifier training, and classification of hardcopies. In other embodiments, the modules of the image processing system 102 can be implemented in hardware using a system on chip (SoC). As should be obvious to one of ordinary skill in the art, the system 100 can be reconfigured or changed depending on user preferences and scenarios for each predefined class. For example, the printing device 108 can be represented by a network of printing devices distributed among different users or departments. Each class of the document hardcopy image is accompanied by a predefined scenario or scenarios with a list of necessary actions. For example, after the hardcopy sorting of the document with the predicted class "invoice", the document's scanned copy should be printed on the printer located in an accounting department with a copy via email to responsible specialists. It is possible to implement the system 100 without the scanning device 101 and the hardcopy sorting apparatus 107, by inputting document images into the system via any other suitable devices, such as local or remote storages, photo or video cameras or other image capturing devices.

Furthermore, the term "image descriptor", or "visual descriptor" is used herein in its common meaning known to one of ordinary skill in the art, and relates to the description of elementary characteristics of the whole image or each image region. Such an image descriptor can be presented in any form, depending on particular application. For example, the image descriptor can be a numeric vector of integer, real or binary numbers, but not limited thereto.

Figure 2:
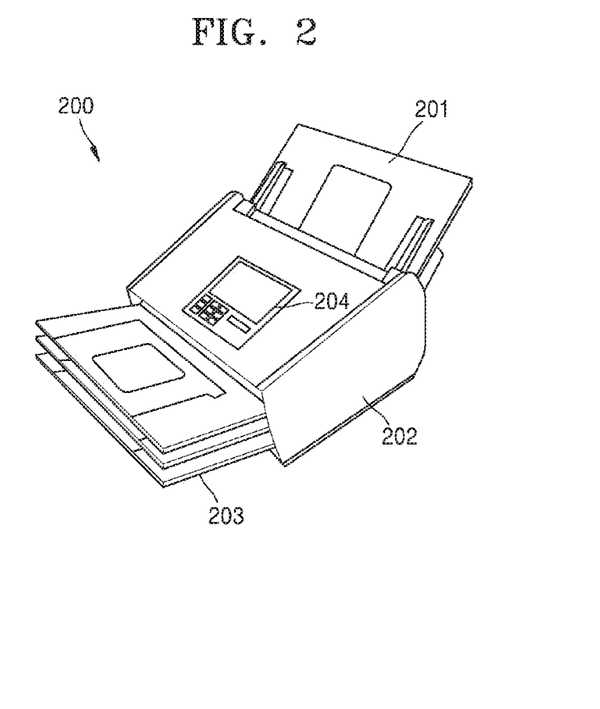
FIG. 2 illustrates a hardcopy sorting apparatus according to an embodiment of the present disclosure.

FIG. 2 illustrates a hardcopy sorting apparatus according to an embodiment of the present disclosure.

Referring to FIG. 2, a hardcopy sorting apparatus 200 executes functions of at least scanning and hardcopy sorting devices and includes a body 202, at least one input bin 201 and output bin 203 for operations with document hardcopies. A display and control panel 204 is optional and can be substituted by a notification indicator.

It is assumed that a user puts a bunch of document hardcopies to be captured into the input bin (or input bins) 201, selects a preferred sorting mode via the display and control panel 204 or uses a default sorting mode, and receives the sorted document hardcopies from the output bins 203. The document hardcopy images are captured by an image capturing means that can be one of a scanner, a facsimile machine, a photo camera, a video camera, a reader for reading an image file from a storage medium, an input unit for receiving an image file via the Internet.

The sorting mode determines a set of classification parameters including a preferred classifier or combination of classifiers for a current sorting process, and a list of assigned output bins for each class of the document hardcopies images (also referred herein as "hardcopy class" for shot) or a sorting category designated for a group of such classes. Thus, the sorting process is applied based on the prediction of a hardcopy class and by placing a hardcopy into an appropriate output bin assigned for that class.

The term "class" may refer to, for example, a type of hardcopy images that are classified to share a common attribute. For example, according to hardcopy image classification, a first class may be assigned to 'evaluation forms', a second class may be assigned to 'contracts', and a third class may be assigned to 'invoices'.

If the hardcopy sorting apparatus 200 has only one output bin 203, two possible embodiments are possible a first embodiment supposes only sorting of hardcopies with outputting all hardcopies into the single output bin, and a second embodiment supposes outputting of hardcopies into the output bin until input hardcopies have the same class. If classes of a current hardcopy and a previous hardcopy are different, the hardcopy sorting apparatus 200 (via the display and control panel 204, for example) prompts the user to empty the output bin 203 and manually put all the hardcopies inside it to a corresponding hardcopy bunch. Then, the sorting process goes on. Obviously, the hardcopy sorting apparatus 200 with only one bin can be any scanner or MFP with an automatic paper feeder. The hardcopy sorting apparatus 200 can include other system modules, including the image processing system 102 and the printing or storage devices 108 and 109, respectively.

Figure 3:
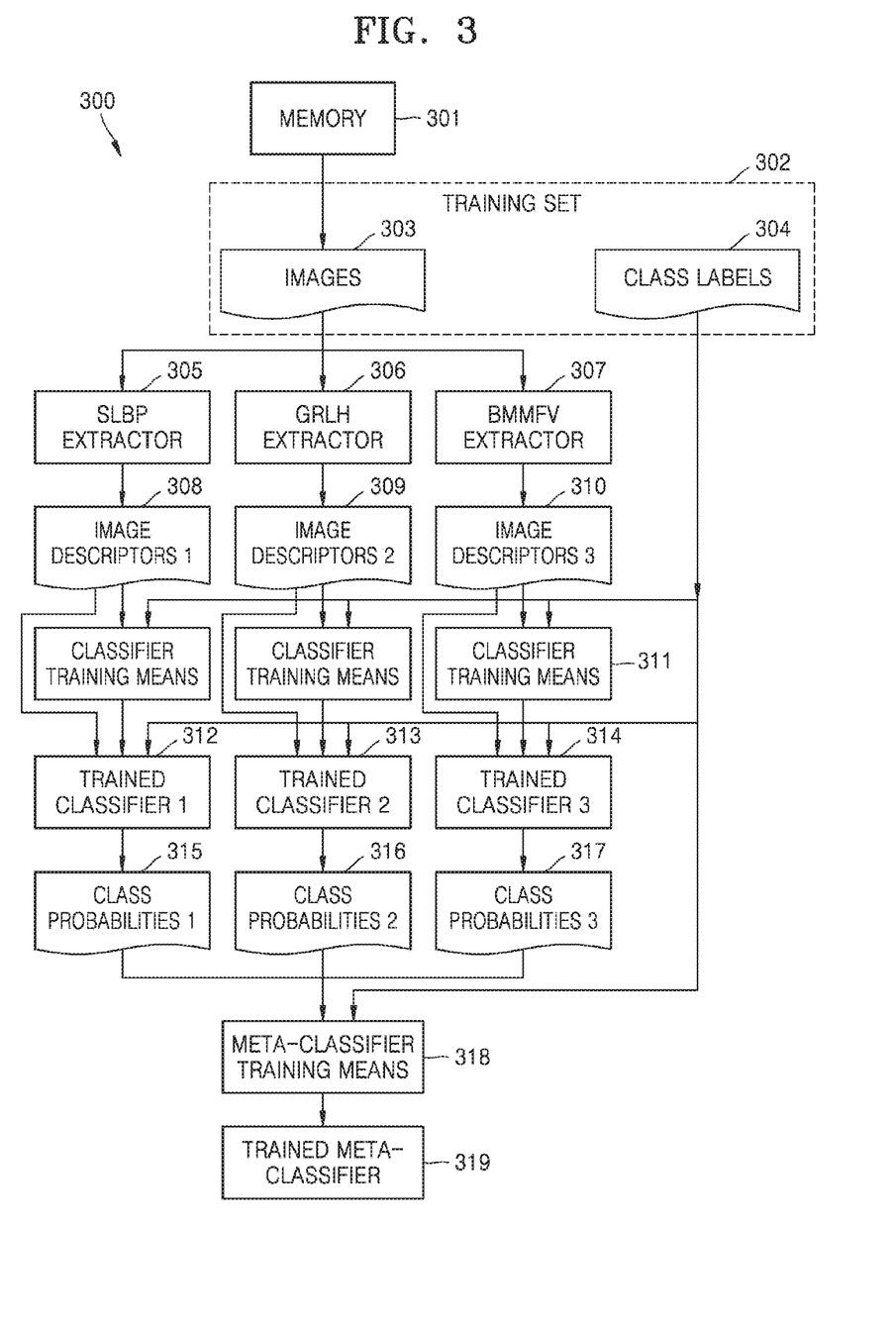
FIG. 3 illustrates a flowchart of a training module according to an embodiment of the present disclosure.

FIG. 3 illustrates a flowchart of a training module according to an embodiment of the present disclosure.

Figure 4:
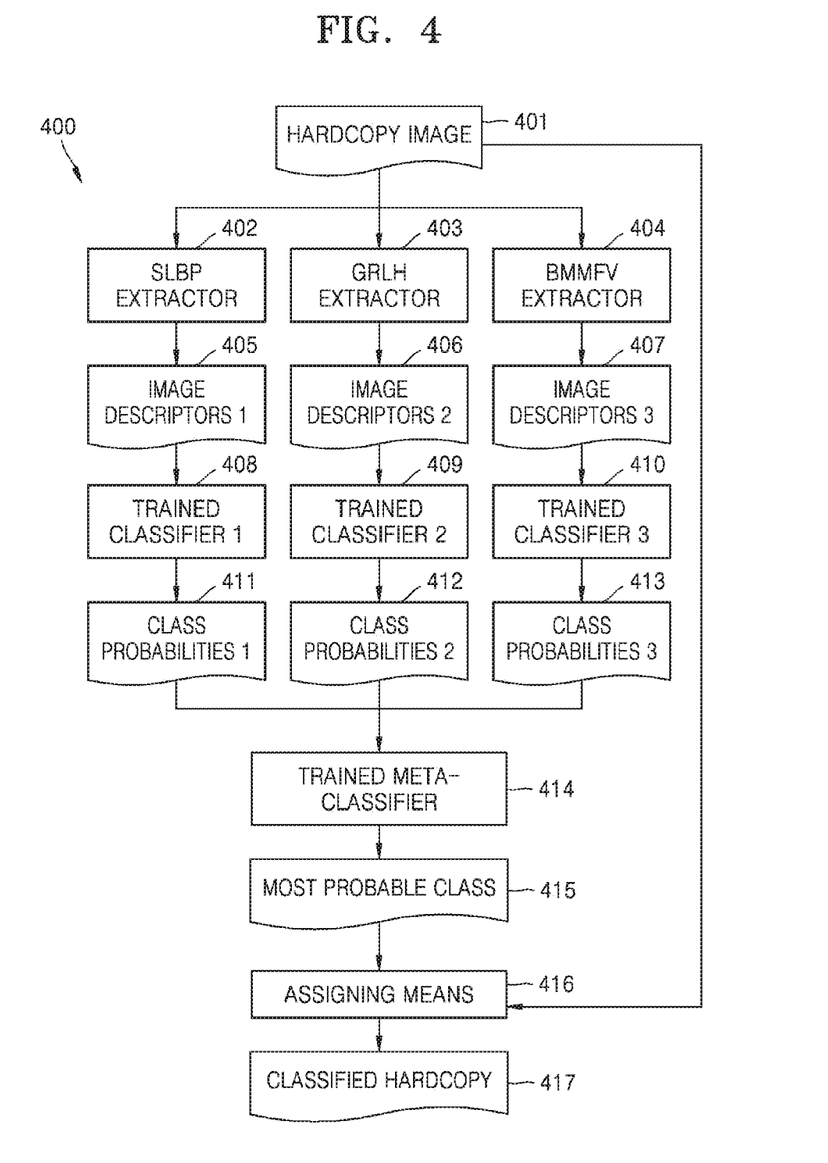
FIG. 4 illustrates a flowchart of a prediction module according to an embodiment of the present disclosure.

FIG. 4 illustrates a flowchart of a prediction module according to an embodiment of the present disclosure.

Referring to FIGS. 3 and 4, a training module 300 and a classification module 400 will be now described.

The training module 300 is utilized prior to the classification module 400 to adapt the system 100 to a user-defined training dataset. The training module 300 should be utilized again when a new hardcopy class or classes are added to the system 100.

The operation of the training module 300 is based on classifier training in accordance with user-labeled hardcopy images, where labels can be either numeric or textual, for example, "1", "2", "3", "4", or "invoice", "e-mail", "report" and so forth. The user assigns a label to each image in advance.

The training module 300 receives the training set consisting of the training images and assigned labels, chooses a random subset of the training set, and stores the random subset in a memory 301. The classifier training is applied independently in respect of multiple classifiers (one classifier per descriptor extractor) and a meta-classifier. In an embodiment, three image descriptor extractors are used, namely a SLBP extractor 305, a GRLH extractor 306, and an aggregated local descriptors based on Bernoulli Mixture Model Fisher vectors (BMMFV) extractor 307. Trained classifiers are utilized in the classification module 105. It is possible to train a set of classifiers for different classification scenarios by changing the training set and the quantity of desired classes.

The operation of the training module can be described as follows:

1. At first, a training set 302 is stored in the memory 301, with the storing involving receiving the training set, choosing a random subset from the training set and storing the random subset in the memory 301.

2. Then, training images 303 are received from the memory 301 by three image descriptor extractors, that is, the SLBP 305, the GRLH 306, and the BMMFV extractor 307.

3. Training-image descriptors 308, 309 and 310 are extracted for the training images 303 by using the SLBP 305, the GRLH 306, and the BMMFV extractor 307.

4. After that, multiple trained classifiers 312, 313 and 314 are trained by using one or more classifier training means 311, which utilize the extracted training-image descriptors 308, 309 and 310 and class labels 304 extracted from the training set 302 for training. In an embodiment, the trained classifiers are trained via support vector machines (SVMs).

5. Next, class probabilities 315, 316 and 317 of the images 303 are estimated by using the trained classifiers 312, 313 and 314. The class probabilities 315, 316 and 317 are numeric vectors of real numbers that represent the probability of the hardcopy image to belong to a certain class.

6. Finally, a meta-classifier 319 is trained by using a meta-classifier training means 318 that utilizes the class probabilities 315, 316 and 317 and the class labels 304 from the training set 302 for training. In an embodiment, the meta-classifier 319 is implemented via SVM. The class probabilities 315, 316 and 317 are concatenated into a single vector.

The trained classifiers 312, 313 and 314 are utilized in the classification module 105. The user has an ability to modify or retrain the trained classifiers 312, 313 and 314 during system operation by supplementing the training module 104 with an updated or new training set.

Referring to FIG. 4, the operation of the classification module 400 can be described as follows:

1. At first, a document hardcopy image 401 is provided to image descriptor extractors 402, 403 and 404.

2. Then, the image descriptor extractors 402, 403 and 404 extract image descriptors 405, 406 and 407, respectively. In an embodiment, the image descriptor extractors 402, 403 and 404 are SLBP, GRLH and BMMFV extractors. Note that the image descriptor extractors 402, 403 and 404 and 305, 306, 307 can be the same.

3. After that, multiple trained classifiers 408, 409 and 410 estimate class probabilities 411, 412 and 413. In an embodiment, the multiple trained classifiers 408, 409 and 410 are implemented via SVM. Note that the trained classifiers 408, 409, 410 and 312, 313, 314 are the same.

4. Next, a trained meta-classifier 414 determines a most probable class 415 by using the class probabilities 411, 412 and 413 concatenated into a single vector. In an embodiment, the trained meta-classifier 414 is implemented via SVM. Note that the trained meta-classifiers 414 and 319 are the same.

5. Finally, the most probable class 415 is assigned to the hardcopy image 401 by using an assigning means 416, which yields a classified hardcopy 417.

Figure 5:
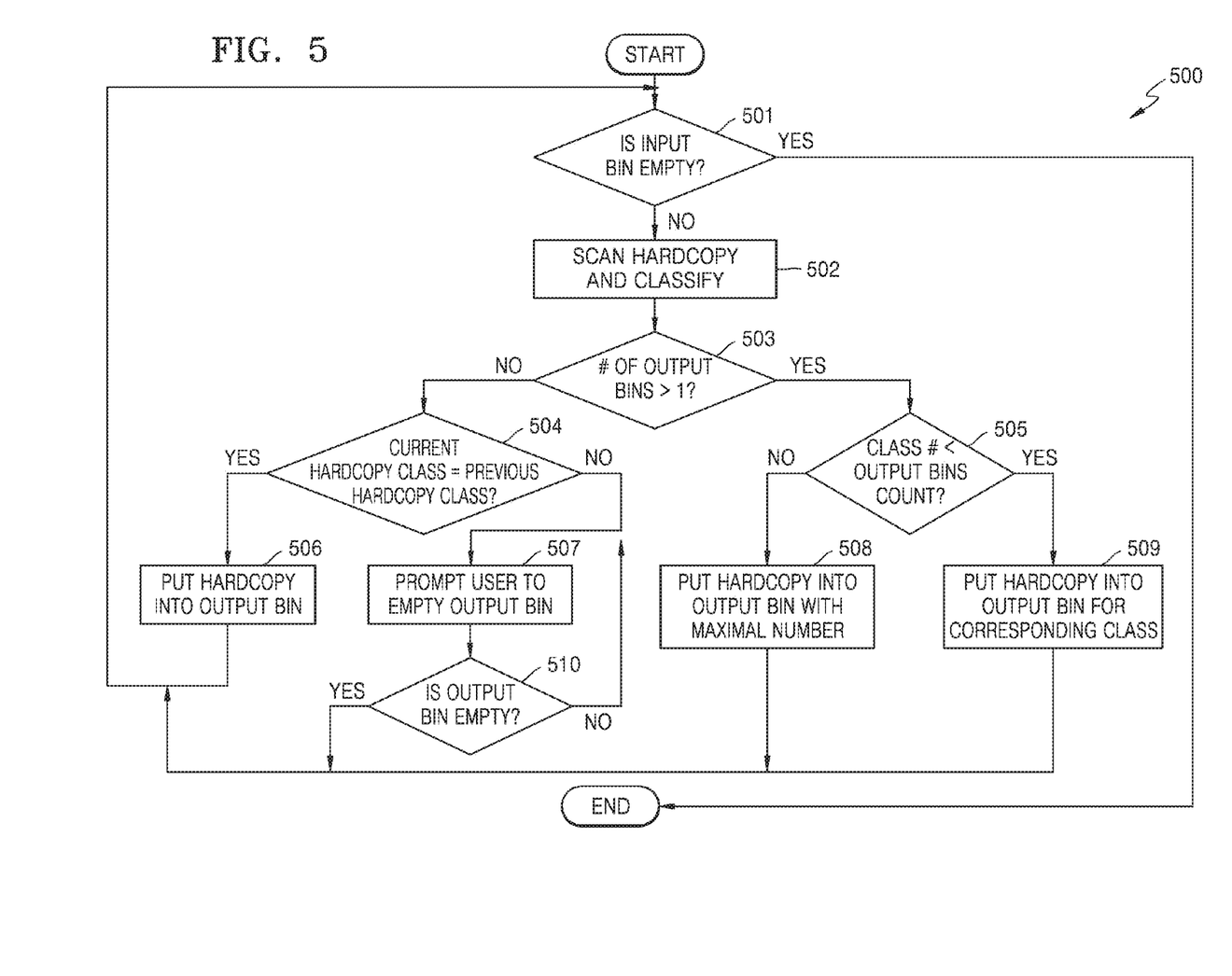
FIG. 5 illustrates a flowchart of a hardcopy sorting module according to an embodiment of the present disclosure.

FIG. 5 illustrates a flowchart of a sorting process for a hardcopy sorting apparatus according to an embodiment of the present disclosure.

Referring to FIG. 5, a sorting process is continued while hardcopies are inserted in the input bin 201 and stops if the input bin is empty (operation 501). Each input hardcopy from the input bin 201 is scanned and classified (operation 502). If the hardcopy sorting apparatus 200 has only one output bin 203, which is determined at operation 503, the hardcopy sorting apparatus 200 receives and scans input hardcopies one by one though the operations 502 and 506 until input documents have the same class. If classes of a current document and a previous document are different and the result of 504 becomes false, the hardcopy sorting apparatus 200 prompts the user to empty the output bin 203 and manually put all the documents inside it to a corresponding class bunch (operations 507 and 510). If there are at least two or more output bins 203, which is determined at operation 503, and the quantity of the output bins 203 is less then predefined classes or sorting categories in accordance with the result of operation 505, the hardcopy sorting apparatus 200 puts first N–1 classes (where N is a number of output bins) into separate bins, and all the rest of classes into the last bin (operations 502, 505, 508 and 509). If the quantity of the output bins 203 is equal or greater then predefined classes or sorting categories, each hardcopy should be outputted to the appropriate output bin 203 designated for a current document class.

According to an embodiment of the training module 300 and the classification module 400, three different classification methods can be applied to address a classification task. All of them are divided into two operations: the extraction of the image descriptors 405, 406, 407, and the classification of the image descriptors by using the corresponding classifiers 408, 409, 410. All three algorithms use the SVM classifiers with a different setup. The image descriptor extractors are the following ones: the SLBP extractor 402, the GRLH extractor 403, and the BMMFV extractor 404.

Figure 6:
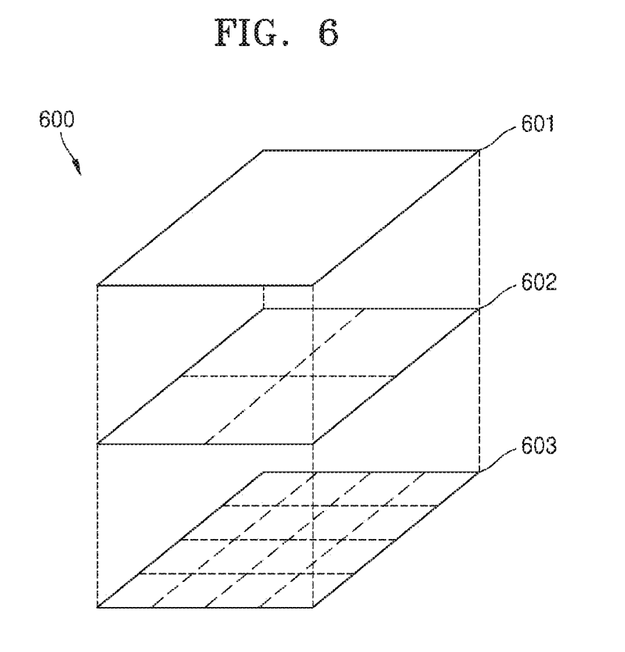
FIG. 6 illustrates an image spatial pyramid subdivision process according to an embodiment of the present disclosure.

FIG. 6 illustrates an extraction of an image descriptor based on an SLBP according to an embodiment of the present disclosure.

Referring to FIG. 6, the SLBP is extracted as follows: at first, an input image of a scanned document 601 is converted into a grayscale image and divided into a plurality of sub-images 602 and 603 by using an image subdivision process 600, wherein each image is subdivided into multiple vertical and horizontal stripes. Then, all the images 601, 602 and 603 (13 images or stripes in total) are downscaled to the pixels size of 100×100, and each pixel of these images is turned into a local binary pattern (LBP), according to Equation 1. Scaling is performed by using a bilinear transformation:

$$LBP(g_0) = \sum_{i=1}^{8} s(g_0, g_i) \cdot 2^{i-1}$$ Equation 1 where $g_i$ is the intensity of an i-th neighbor pixel, and $s(g_0, g_i)$ is the function comparing pixel intensities and returns a binary code:

$$s(g_0, g_i) = \begin{cases} 1, & g_0 \geq g_i, \\ 0, & g_0 < g_i. \end{cases}$$ Equation 2

Figure 7:
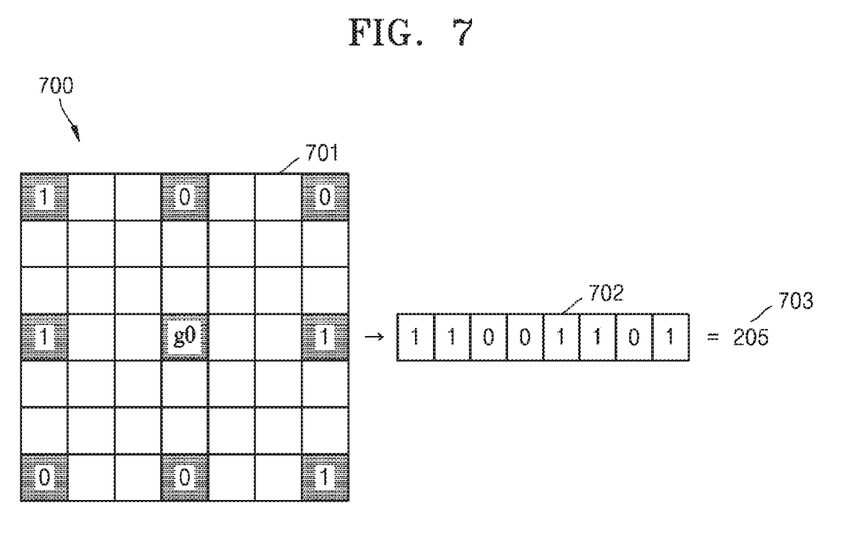
FIG. 7 illustrates a local binary pattern (LBP) extraction process according to an embodiment of the present disclosure.

FIG. 7 illustrates an LBP extraction process 700 according to an embodiment of the present disclosure.

Referring to FIG. 7, an LBP is converted into a numerical binary sequence by the extraction of pattern elements starting from the top-left pixel in a counter clockwise direction 701 with 3 pixel margin between a central pixel and its neighbors. Extracted 1's and 0's form an 8-bit pattern 702, which is interpreted as an unsigned byte 703. These bytes are combined into an 8-bin histogram and normalized in the range of [0; 1]. A final descriptor has the following length: 13 subimages×8 bin histogram=104.

Each subimage has the pixel size of 100×100, and thus histogram values can be converted from integer to real numbers within [0;1] by dividing them by $10^4$. The goal of scaling is to provide different levels of detailing for each histogram band. This makes it possible not only to preserve details in smaller stripes, but also eliminate noises.

Figure 8:
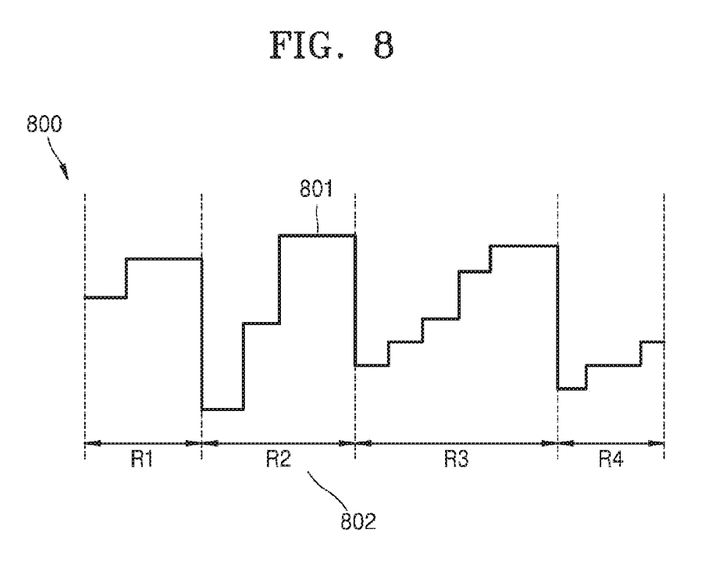
FIG. 8 illustrates a grayscale runlength histogram (GRLH) extraction process according to an embodiment of the present disclosure.

FIG. 8 illustrates a GRLH extraction process according to an embodiment of the present disclosure.

Referring to FIG. 8, a GRLH extractor applies spatially-localized grayscale runlengths. It is computed as follows.

At first, an input image of a scanned document is transformed into a grayscale image and downsampled to a predefined size. In an embodiment, the predefined size is equal to $5×10^5$ pixels. Then, it is partitioned into a plurality of subimages by using the aforementioned spatial pyramid of FIG. 6. Each image is processed with grayscale runlength encoding: a run is a sequence of pixels with a lightness variance in nearby pixels less than a predefined value, and thus all runs 802 named R1-R4 in an image line 801 can be found by iterating though its pixels and looking for high variances in neighbor pixels, as shown in FIG. 8.

The GRLH extractor uses a threshold equal to 30 to separate nearby runs. Run lengths are quantized by using a logarithmic scale and stored in two 9-bin histograms according to a difference between an average pixel value in a current run and a previous run. If the current run is lighter than the previous one, it is stored in the first histogram or to the second histogram otherwise. The GRLH extractor calculates line histograms for horizontal, vertical, diagonal and anti-diagonal directions. The histograms from all subimages, directions and lightnesses are concatenated into a single feature vector having the size of 1512 bytes. The final feature vector is normalized in the range of [0; 1].

Using grayscale images instead of binary allows one to avoid a binarization operation that may completely destroy image content if a binarization algorithm wrongly estimates a brightness separation threshold. It is a very possible situation when a document image has a low contrast or too many images with overlapping text inside. A typical example is a magazine page. Unlike a binary image based descriptors, the present disclosure does not suffer from this problem because it performs some sort of local binarization along each direction, which makes it more sensitive to small details.

Local descriptors aggregated with Fisher vectors on the basis of a BMMFV (see P. Viola, M. Jones, "Rapid Object Detection using a Boosted Cascade of Simple Features", Computer Vision and Pattern Recognition (CVPR) 2001, Proceedings of the 2001 Institute of Electrical and Electronics Engineers (IEEE) Computer Society Conference, 2001, Uchida, Yusuke, and Shigeyuki Sakazawa, "Image Retrieval with Fisher Vectors of Binary Features", Pattern Recognition (ACPR), and 2013 2nd IAPR Asian Conference on. IEEE, 2013) are obtained as follows.

At first, local descriptors $X=\{x_1, \ldots, x_t, \ldots, x_T\}$ are extracted from an input image and projected onto a T/2 dimensional space by using Principal Component Analysis (PCA). There are no special requirements for a local descriptor type, but the proposed implementation uses Binary Robust Invariant Scalable Keypoints (BRISK) or Oriented Robust Binary (ORB) Independent Elementary Features descriptors (see E. Rublee, V. Rabaud, K. Konolige, G. Bradski, "ORB: an efficient alternative to SIFT or SURF", Computer Vision (ICCV), 2011 IEEE International Conference on. IEEE, 2011). Then, a Bernoulli mixture model (BMM) $\lambda=\{w_i, \mu_{id}, i=1 \ldots N, d=1 \ldots D\}$ is trained, where N is the number of components in the BMM and D is N. Using this model, the module computes Fisher scores for each local descriptor:

$$G^X_{\mu_{id}} = \frac{1}{T}\sum_{t=1}^{T} \gamma_t(i) \frac{(-1)^{1-x_{td}}}{\mu_{id}^{x_{td}}(1-\mu_{id})^{1-x_{td}}} \quad \text{Equation 3}$$

Here, T is the number of binary features extracted from an image, and $\gamma_t(i)=p(i|x_s, \lambda)$. Then, a module obtains a Fisher matrix:

$$F_{\mu_{id}} = Tw_i \left( \frac{\sum_{j=1}^{N} w_j \mu_{jd}}{\mu_{id}^2} + \frac{\sum_{j=1}^{N} w_j(1-\mu_{jd})}{(1-\mu_{id})^2} \right) \quad \text{Equation 4}$$

Finally, a Fisher vector $G_\lambda^X$ is obtained with the concatenation of the normalized Fisher scores $$F_{\mu_{id}}^{-\frac{1}{2}} G^X_{\mu_{id}} (i=1 \ldots N, d=1 \ldots D).$$

The Fisher vector is further normalized with power normalization (taking a square root of each vector value) and $L_2$ normalization (dividing each vector value by the vector Euclidean norm). Given the Fisher vector z=, a power-normalized vector f(z) is calculated as $f(z)=\text{sign}(z)|z|^\alpha$, where $\alpha=0.5$.

After the power normalization, the $L_2$ normalization is performed for f(z), resulting in a final Fisher vector descriptor of the set of binary features. The BMMFV extractor obtains one Fisher vector per each subimage 601 and 602 (5 subimages in total) and concatenates all of them into the single feature vector descriptor.

The motivation behind using the BMM instead of a well-known Gaussian mixture model (GMM) is that the GMM is designed to work on the top of normal distribution, which is a distribution of random real-valued numbers. A large number of descriptors are real-valued too, and thus using the GMM is normal in this case. However, the binary descriptors, such as BRISK and ORB, do not match for the GMM, while the Bernoulli distribution does.

Once feature vectors are obtained, they are classified by using a SVM. In the case of an SLBP and a GRLH, SVMs 408 and 409 utilize the following intersection kernel Equation 5:

$$K(x, y) = \sum_{i=1}^{N} \min(x_i, y_i) \quad \text{Equation 5}$$

And a BMMFV SVM 410 uses the following linear kernel Equation 6:

$$K(x, y) = \sum_{i=1}^{N} x_i y_i \quad \text{Equation 6}$$

In both cases, an SVM parameter C (cost) is set to 10.

Each SVM provides a vector of class probabilities, which length corresponds to the number of image classes. These vectors are concatenated into a single vector, which is treated as a new feature vector. This feature vector is utilized for the prediction of an image class by using a meta-classifier, which is an SVM with $\chi^2$ kernel:

$$K(x, y) = -\gamma \sum_{i=1}^{3KN} \frac{(x_i - y_i)^2}{x_i + y_i} \quad \text{Equation 7}$$

where K is the number of classifiers and N is the number of possible classes. The output of the meta-classifier is a probability vector of size N.

In summary, the present disclosure introduces a set of modules for hardcopy image descriptor extraction and classification using multiple trained classifiers 1), a meta-classifier 2), and a hardcopy sorting apparatus 3). Image descriptor extractors include an SLBP extractor, a GRLH extractor and a BMMFV extractor. All the extractors utilize image features in the form of binary, integer or real numbers, which makes them useful in the cases when it is hard to extract a document layout that is mandatory for layout-based methods. Thus, the present disclosure does not impose any restrictions on document content.

The major improvement of an SLBP over the existing approaches based on LBPs (see, for example, T. Ojala, M. Pietikäinen, M. Maenpaa, "Multiresolution gray-scale and rotation invariant texture classification with local binary patterns", PAMI, 2010, and Hongming Zhang, Wen Gao, Xilin Chen, Debin Zhao, "Object detection using spatial histogram features", Image and Vision Computing, Volume 24, iss. 4, 1 Apr. 2006, pp. 327-341, ISSN 0262-8856) is that the proposed implementation applies the recursive block-based spatial subdivision of an input image combined with block rescaling to a predefined size, which allows avoiding histogram normalization and each image block to be processed in multiple scales.

The proposed concept of the GRLH is close to the existing approaches, but in contrast to them, the present disclosure does not include a binarization operation, which makes it possible to use the system 100 not only for simple black-and-white documents, but for complex document images too. Hence, it allows avoiding binarization errors, which can make classification completely infeasible.

As for the BMMFV, its concept is described, for example, here: J. Sanchez, F. Perronnin, T. Mensink, J. Verbeek, "Image Classification with the Fisher Vector: Theory and Practice", In International Journal of Computer Vision 105, pp 222, 245, 2013. The present disclosure extrapolates the concept to the hardcopy classification problem. Instead of the known approaches, the present disclosure combines Fisher vectors with a Bernoulli mixture model and spatial stripe-based subdivision, which significantly improves classification accuracy and classifier robustness against various document transformations, such as rotation, layout changes and so forth. Using the Bernoulli mixture model is more correct in the case of using binary image descriptors, such as ORB or BRISK, rather than using a GMM, which is a typical choice in the most of the existing approaches.

The SLBP, GRLH and BMMFV are very different image descriptor extractors, and thus they tend to extract different image features, hence, using the meta-classifier on the top of these three extractors combined with any classifiers allows one to enhance classification accuracy.

The present disclosure proposes a flexible scheme of classifier utilization. It is possible to use all three classifiers or only one classifier in order to provide, to an end user, a various number of classification profiles. For example, the GRLH may be applied for fast classification of documents with a fixed layout, the BMMFV are good for flexible layout classification, and meta-classification is a perfect solution for complicated cases, when none of the classifier can classify images with sufficient accuracy.

The present disclosure can be efficiently applied to scanned document classification or hardcopy sorting problems. The proposed system 100 is able to classify documents with either fixed or flexible layouts with high accuracy even if document distortions are presented, such as skew, rotation, low contrast and the others. The proposed system 100 can be embedded into any one of an MFP, a smartphone, a server-based solution, or deployed as a standalone application. A high classification speed and multicore-based processing make it possible to use the proposed system 100 for a large number of documents. The proposed hardcopy sorting apparatus 200 is able to sort bunches of documents automatically, without user interaction, with a high sorting speed.

According to the present disclosure, an automatic document classification method that efficiently analyzes document images based on analyzed images and descriptors may be provided.

While the present disclosure has been shown and described with reference to various embodiments thereof, it will be understood by those skilled in the art that various changes in form and details may be made therein without departing from the spirit and scope of the present disclosure as defined by the appended claims t and their equivalents.

What is claimed is:

1. A method of classifying document hardcopy images, the method comprising:
    providing a document hardcopy image, the document hardcopy image having image features;
    extracting image descriptors by a first set of image descriptor extractors, each image descriptor of the image descriptors being descriptive of the image features of the document hardcopy image;
    estimating class probabilities of the document hardcopy image by multiple trained classifiers based on the image descriptors;
    determining a most probable class of the document hardcopy image by a trained meta-classifier based on the class probabilities estimated by the multiple trained classifiers;
    inputting the document hardcopy image and the most probable class of the document hardcopy image to an assigner; and
    assigning, by the assigner, the most probable class determined by the trained meta-classifier to the document hardcopy image to obtain a classified document hardcopy image,
    wherein the first set of image descriptor extractors comprise a spatial local binary pattern (SLBP) extractor, a grayscale runlength histogram (GRLH) extractor, and a Bernoulli Mixture Model Fisher vectors (BMMFV) extractor.

2. The method of claim 1, wherein the multiple trained classifiers and the trained meta-classifier are obtained by:
    storing a training set comprising training images and class labels in a memory, the class labels being associated with the training images, and each training image of the training images having training-image features;
    extracting training-image descriptors by a second set of image descriptor extractors, each training-image descriptor of the training-image descriptors being descriptive of the training-image features of each training image of the training images;
    obtaining the multiple trained classifiers by a classifier trainer by using the training-image descriptors and the class labels associated with the training images;
    estimating class probabilities of the training images by the multiple trained classifiers; and
    obtaining the trained meta-classifier by a meta-classifier trainer based on the class probabilities estimated by the multiple trained classifiers and the class labels associated with the training images.

3. The method of claim 2, wherein a number of the multiple trained classifiers is equal to a number of the image descriptor extractors in the second set of image descriptor extractors, and each of the multiple trained classifiers is associated with one of the second set of image descriptor extractors.

4. The method of claim 2, wherein the second set of image descriptor extractors comprise a spatial local binary pattern (SLBP) extractor, a grayscale runlength histogram (GRLH) extractor, and a Bernoulli Mixture Model Fisher vectors (BMMFV) extractor.

5. The method of claim 4, wherein the extracting of the image descriptors or the training-image descriptors by the SLBP extractor comprises:
    recursive subdividing the document hardcopy image or each training image of the training images into plurality of horizontal and vertical stripes;
    downsampling each stripe to the same size;
    extracting a local binary pattern (LBP) for each pixel of each downsampled stripe;
    computing a binary pattern histogram for each downsampled stripe;
    concatenating the computed binary pattern histograms into the image descriptor or the training-image descriptor; and
    normalizing the image descriptor or the training-image descriptor.

6. The method of claim 4, wherein the extracting of the image descriptors or the training-image descriptors by the GRLH extractor comprises:
    downsampling the document hardcopy image or each training image;
    recursive subdividing the downsampled document hardcopy image or training image into a plurality of horizontal and vertical stripes;
    extracting runlengths of similar brightness for each line of stripe in horizontal, vertical, diagonal and anti-diagonal directions;
    computing runlength histograms for each stripe, brightness value and length;
    concatenating the computed runlength histograms into the image descriptor or the training-image descriptor; and
    normalizing the image descriptor or the training-image descriptor.

7. The method of claim 4, wherein the extracting of the image descriptors or the training-image descriptors by the BMMFV extractor comprises:
    downsampling the document hardcopy image or each training image of the training images;
    recursive subdividing the downsampled document hardcopy image or the training image into a plurality of horizontal and vertical stripes;
    extracting binary local descriptors for each stripe;
    reducing dimensions of the extracted binary local descriptors by using a principal component analysis algorithm (PCA);

computing a Bernoulli mixture model for the dimensionally-reduced local descriptors;
computing Fisher vectors on the basis of the computed Bernoulli mixture model;
power normalizing and L2 normalizing of the computed Fisher vectors; and
concatenating the normalized Fisher vectors for each stripe into the image descriptor or the training-image descriptor.

8. The method of claim 2, wherein each of the image descriptor and the training-image descriptors is a numeric vector of integer, real or binary numbers.

9. The method of claim 2, wherein the image features and the training-image features relate to a shape, texture and/or color of the document hardcopy image and the training images, respectively.

10. The method of claim 2, wherein the first set of image descriptor extractors and the second set of image descriptor extractors are the same set of image descriptor extractors.

11. The method of claim 2, wherein classes of the document hardcopy image and the training images are integer numbers or textual labels.

12. The method of claim 2, wherein the storing of the training set further comprises:
receiving the training set;
choosing a random subset of the training images and the class labels from the training set; and
storing the random subset in the memory.

13. The method of claim 1, wherein the multiple trained classifiers are multiple support vector machines (SVM).

14. The method of claim 13, wherein the determining of the most probable class by the trained meta-classifier comprises:
concatenating multiple probability vectors estimated by the multiple trained classifiers into a single vector;
estimating the class probabilities of the document hardcopy image by using the SVM and the single vector; and
choosing the class with a highest probability as the most probable class based on the estimated class probabilities.

15. The method of claim 1, wherein the estimating of the class probabilities of the document hardcopy image comprises obtaining a vector of real numbers that represents probabilities of the document hardcopy image to belong to a certain class.

16. A device for classifying document hardcopy images, the device comprising:
a memory to store instructions; and
at least one processor electrically connected to the memory that when executing the stored instructions is to:
classify the document hardcopy images, including a first set of image descriptor extractors to extract image descriptors for a document hardcopy image inputted to the first set of image descriptor extractors, the document hardcopy image having image features, and each image descriptor of the image descriptors being descriptive of the image features of the document hardcopy image,
estimate class probabilities of the document hardcopy image by using the image descriptors,
determine a most probable class of the document hardcopy image by using the class probabilities estimated by multiple trained classifiers, and
assign the most probable class to the document hardcopy image to obtain a classified document hardcopy,
wherein the first set of image descriptor extractors comprise a spatial local binary pattern (SLBP) extractor, a grayscale runlength histogram (GRLH) extractor, and a Bernoulli Mixture Model Fisher vectors (BMMFV) extractor.

17. The device of claim 16, wherein the at least one processor is further to:
store in the memory a training set comprising training images and class labels, the class labels being associated with the training images, and each training image of the training images having training-image features;
receive the training images of the training set stored in the memory and extract training-image descriptors, each training-image descriptor of the training-image descriptors being descriptive of the training-image features of each training image of the training images;
obtain the trained multiple classifiers by using the training-image descriptors extracted by a second set of image descriptor extractors and the class labels associated with the training images, wherein the multiple trained classifiers are to estimate class probabilities of the training images; and
obtain a trained meta-classifier by using the class probabilities estimated by the multiple trained classifiers and the class labels associated with the training images.

18. A system for sorting document hardcopies, the system comprising:
a hardcopy sorting apparatus including:
an input bin for document hardcopies,
an image capturer to capture document hardcopy images,
a notification indicator to display an assigned class of each document hardcopy image of the document hardcopy images, and
one or more output bins for sorted document hardcopies; and
at least one processor to:
assign the class to each document hardcopy image of the document hardcopy images,
assign, to each document hardcopy of the document hardcopies, the output bin according to the assigned class of each document hardcopy image of the document hardcopy images,
receive information about a number of the output bins and a number of non-empty output bins from the hardcopy sorting apparatus and the document hardcopy images having the assigned classes from a device for classifying the document hardcopy images,
assign the number of the output bins to each document hardcopy according to the assigned class of respective document hardcopy image and the number of non-empty output bins, and
route the document hardcopy from the input bin to the assigned output bin,
wherein the device for classifying the document hardcopy images includes a first set of image descriptor extractors including a spatial local binary pattern (SLBP) extractor, a grayscale runlength histogram (GRLH) extractor, and a Bernoulli Mixture Model Fisher vectors (BMMFV) extractor.

19. The system of claim 18, wherein the image capturer is one of a scanner, a facsimile machine, a photo camera, a video camera, a reader for reading an image file from a storage medium, or an input interface for receiving an image file via the Internet.

* * * * *